United States Patent
Anglin et al.

(10) Patent No.: US 7,724,621 B2
(45) Date of Patent: *May 25, 2010

(54) RESTORING A DIGITAL REPRESENTATION OF CONTENT READ FROM AN OPTICAL DISC

(75) Inventors: Howard Anglin, Austin, TX (US); Travis M. Grigsby, Austin, TX (US); Daniel E. Morris, Round Rock, TX (US); Frank A. Nuzzi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 468 days.

This patent is subject to a terminal disclaimer.

(21) Appl. No.: 11/831,225

(22) Filed: Jul. 31, 2007

(65) Prior Publication Data

US 2009/0034386 A1     Feb. 5, 2009

(51) Int. Cl.
*G11B 7/00* (2006.01)
(52) U.S. Cl. .............. 369/53.17; 369/53.16; 369/53.15; 369/53.2; 369/47.14
(58) Field of Classification Search ............... None
See application file for complete search history.

(56) References Cited

U.S. PATENT DOCUMENTS

| 6,188,659 | B1 | 2/2001 | Mueller et al. | |
|---|---|---|---|---|
| 7,230,897 | B2 * | 6/2007 | Izumi | 369/53.15 |
| 2004/0223440 | A1 * | 11/2004 | Park | 369/59.25 |

OTHER PUBLICATIONS

U.S. Appl. No. 11/830,984, filed Jul. 31, 2007, Anglin, Howard, et al.

* cited by examiner

*Primary Examiner*—Muhammad N. Edun
(74) *Attorney, Agent, or Firm*—DeLizio Gilliam, PLLC

(57) ABSTRACT

It has been discovered that inaccurate representations of content read from an optical disc can be restored. A representation of content read from a damaged optical disc may include data that corresponds to misread data sections. The data for the misread data sections can be replaced with portions of an accurate representation of the content. The portions can be extracted from an accurate representation maintained online or at a local repository of digital representations of content.

20 Claims, 11 Drawing Sheets

| USER ID | ACCT INFORMATION | CONTENT ID | DIGITAL DAMAGE SIGNATURE |
|---------|------------------|------------|--------------------------|
|         |                  | CONTENT ID | DIGITAL DAMAGE SIGNATURE |
|         |                  | ⋮          | ⋮                        |
|         |                  | CONTENT ID | DIGITAL DAMAGE SIGNATURE |
|         |                  | CONTENT ID | DIGITAL DAMAGE SIGNATURE |
| USER ID | ACCT INFORMATION | CONTENT ID | DIGITAL DAMAGE SIGNATURE |
|         |                  | ⋮          | ⋮                        |
|         |                  | CONTENT ID | DIGITAL DAMAGE SIGNATURE |

DATA STRUCTURE
901

FIG. 9

RESTORING A DIGITAL REPRESENTATION OF CONTENT READ FROM AN OPTICAL DISC

BACKGROUND

Embodiments of the invention generally relate to the field of digital content, and, more particularly, to restoring a digital content representation read from an optical disc.

DESCRIPTION OF THE RELATED ART

Although rugged, a compact disc can be damaged to the point of affecting playback. Scratches can prevent a compact disc player from accurately reading the compact disc. When the player encounters a section of the compact disc marred by enough scratches that error correcting cannot overcome the scratches, the player may skip to the next section or generate erroneous data. The CD player outputs either a gap or an erroneous sound. When damage to the CD overwhelms the error-correcting, the music on the CD is marred if not lost.

SUMMARY

A digital representation of content is read from an optical disc. A portion of the representation is detected as inaccurately representing a corresponding portion of the content. A portion of the accurate representation of the content is retrieved. The retrieved portion corresponds to at least the detected inaccurate portion. The retrieved portion is integrated into the examined representation to restore the examined representation to accurately represent the content.

BRIEF DESCRIPTION OF THE DRAWINGS

The present invention may be better understood, and its numerous objects, features, and advantages made apparent to those skilled in the art by referencing the accompanying drawings.

FIG. 9 depicts an example data structure that associates digital damage signatures with account information.

DESCRIPTION OF EMBODIMENT(S)

The description that follows includes exemplary systems, methods, techniques, instruction sequences and computer program products that embody techniques of the present invention. However, it is understood that the described invention may be practiced without these specific details. For instance, although examples refer to a compact disc, embodiments are not limited to a compact disc and may instead or in addition be applied to other types of optical discs. In other instances, well-known instruction instances, protocols, structures and techniques have not been shown in detail in order not to obfuscate the description.

When reading content from an optical disc, an optical disc reader indicates sections or blocks of the optical disc that could not be read accurately ("misread sections"). The optical disc reader may not be able to read the optical disc accurately due to damage to the optical disc, such as scratches, or malfunction in the optical disc reader. The optical disc reader indicates those sections that could not be read accurately in a representation of the content read from the optical disc. With the data output for the misread sections ("misread data sections"), the content representation is inaccurate. The misread data sections in the inaccurate content representation are replaced with accurate data that corresponds to those misread sections. Thus, the inaccuracy of the content representation is cured.

Figure 1:
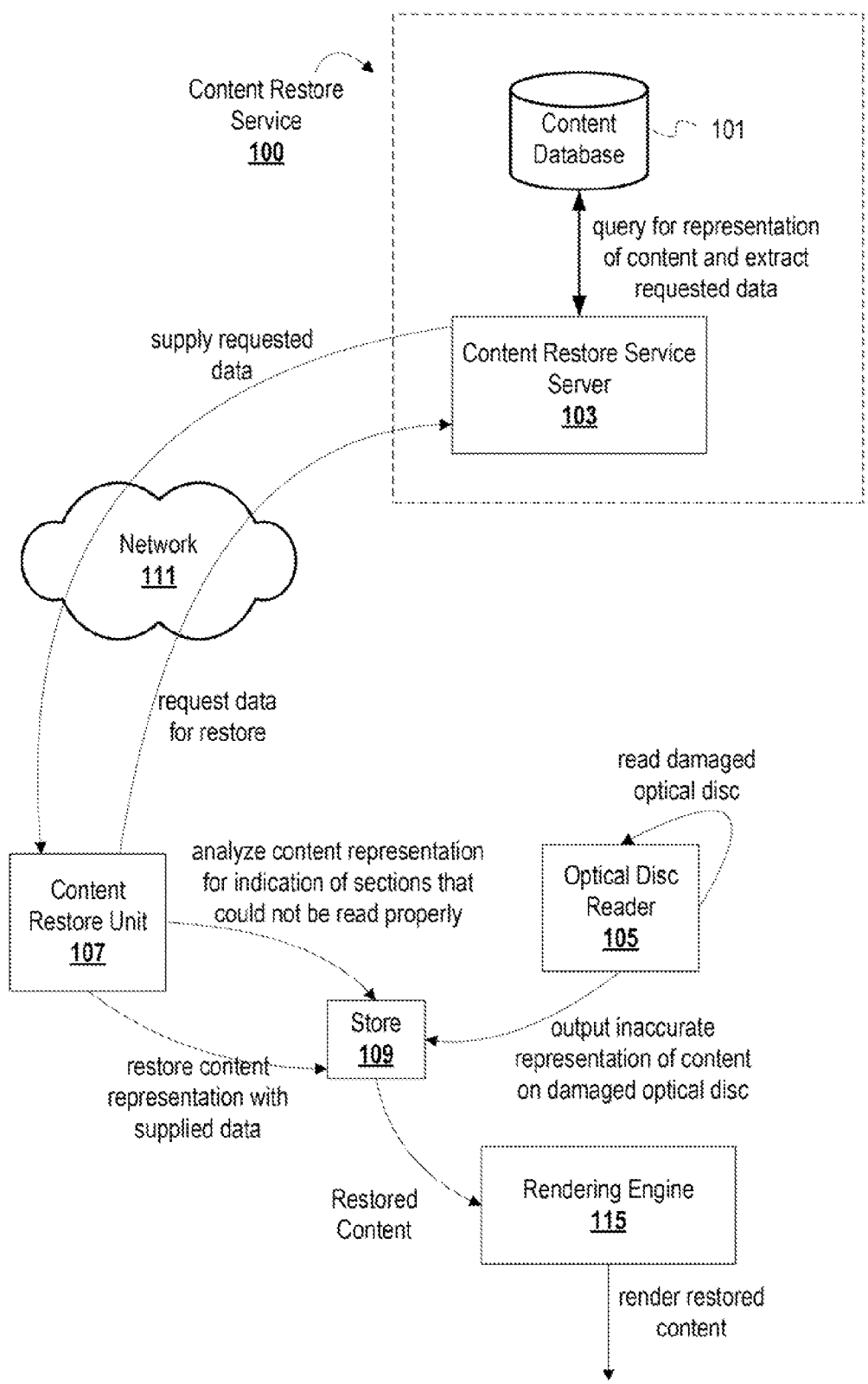
FIG. 1 depicts an example system for restoring inaccurate representations of content output from reading a damaged optical disc.

FIG. 1 depicts an example system for restoring inaccurate representations of content output from reading a damaged optical disc. An optical disc reader 105 reads a damaged optical disc. The optical disc is damaged in some manner that prevents the optical disc reader 105 from accurately reading the optical disc. The optical disc may have been scratched, punctured, partially covered with some adhesive substance, etc. The optical disc reader 105 outputs an inaccurate representation of content on the damaged optical disc into a store element 109 (e.g., buffer, flash memory, registers, etc.). A content restore unit 107 examines the representation stored in the store element 109 for indications of sections that could not be read accurately. Upon discovering misread data sections, the content restore unit 107 communicates with a content restore service 100.

The content restore unit 107 sends a request to a content restore service server 103 at the content restore service 100 via a network 111. The content restore unit 107 requests data to replace the misread data sections. In addition to supplying indications of the misread sections, the content restore unit 107 supplies information that identifies the content and the optical disc. Using this information, the content restore service server 103 queries a content database 101 for a representation of the content (e.g., the content in RAW format, a compressed format, etc.). In one embodiment, the content restore service server 103 extracts the requested data (or more) from the content representation. In another embodiment, the content database 101 returns data extracted from the content representation to the server 103. The content restore service server 103 supplies the extracted data via the network 111 to the content restore unit 107. More than the requested data may be returned for various reasons, such as overlapping to avoid seams when the inaccurate representation is restored.

The content restore unit 107 integrates the supplied data into the inaccurate representation in the store element 109 to restore the content representation to an accurate representation. A rendering engine 115 then reads the accurate content representation or receives the accurate content representation. The rendering engine 115 may play the content, display the content, stream the content, etc. The content representation may be rendered immediately or at a later time. For example, the optical disc reader 105 may be in an automobile that is playing music from the damaged optical disc. As the inaccurate music is buffered (e.g., the buffered music has gaps, hissing, static, etc.), the restore unit 107 examines the buffered music for the misread data and restores the buffered music before it is played. In another example, a user may be archiving movies from purchased optical discs. When a movie or segment of a movie is output to the user's computer, the restore unit 107 examines the movie for misread data that occurs because of damage to the optical disc. The restore unit 107 retrieves valid data from online and restores the movie or movie segment.

It should be understood that the depicted configuration of units in FIG. 1 is meant to aid in understanding embodiments and should not be used to limit embodiments. For example, the restore unit may be implemented as software, hardware, or a combination of hardware and software. The restore unit 107 and the optical disc reader 105 may be embodied together in a single device or as separate devices that exchange data wirelessly, via a cable, etc. In addition, functionality may be implemented differently than depicted in FIG. 1. For instance, the description of FIG. 1 assumes that the optical disc reader 105 indicates the misread data sections (e.g., particular byte strings, identifying misread sections in a header for the content representation, setting a flag for each block, etc.). The functionality for indicating misread sections may be implemented in a restore unit. For example, a restore unit may compare a hash of a content representation output by an optical disc reader to a hash of an online representation of the content to determine that the output content representation includes misread sections. The restore unit may use heuristics to identify misread sections, or pass the inaccurate content representation to an online restore server for identification of the misread sections.

Figure 2:
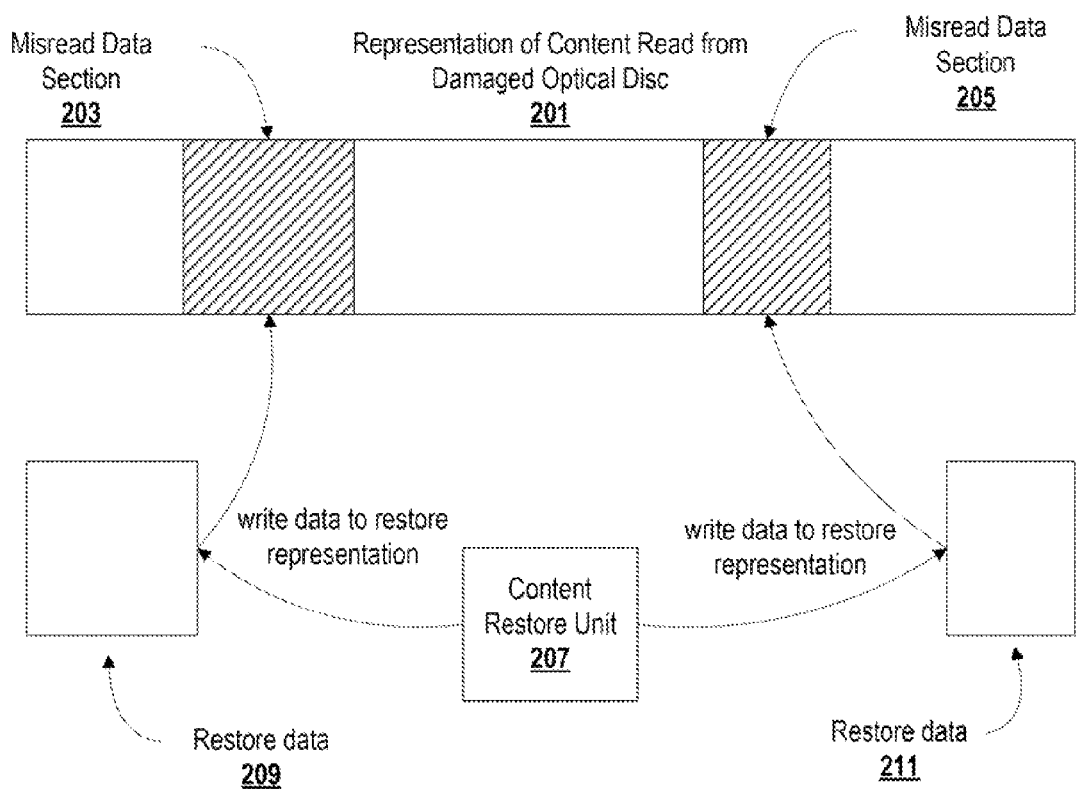
FIG. 2 depicts a conceptual example of a content restore unit restoring a content representation.

FIG. 2 depicts a conceptual example of a content restore unit restoring a content representation. A representation of content 201 has been output from an optical disc reader reading a damaged optical disc. The content representation 201 includes misread data sections 203 and 205. A misread data section may be a string of 0's that represent a section of the optical disc that could not be read. A misread data section may be data generated with an error-correcting mechanism implemented by an optical disc reader that still results in an inaccurate representation of the content. A content restore unit 207 takes restore data 209 and integrates the restore data 209 into the content representation 201. The content restore unit 207 also integrates the restore data 211 to replace the misread data section 205. Various techniques may be utilized to integrate the restore data 209 and 211 into the content representation 201. The content restore unit 207 may overwrite the misread data sections 203 and 205 with the restore data 209 and 211, respectively. The content restore unit 207 may synchronize the boundaries of the restore data 209 and 211 with the boundaries of the misread data section 203 and 205, and then clip some of the boundaries.

Although the above figures use examples of reading from a damaged optical disc, embodiments are not limited to curing inaccurate representations that arise from damaged optical discs. As stated earlier, a representation of content read from an optical disc may be inaccurate due to mechanical failures of an optical disc reader (e.g., failure in the laser, arm, disc rotator, etc.). Embodiments also cure such inaccuracies that arise from optical disc reader failures.

Figure 3:
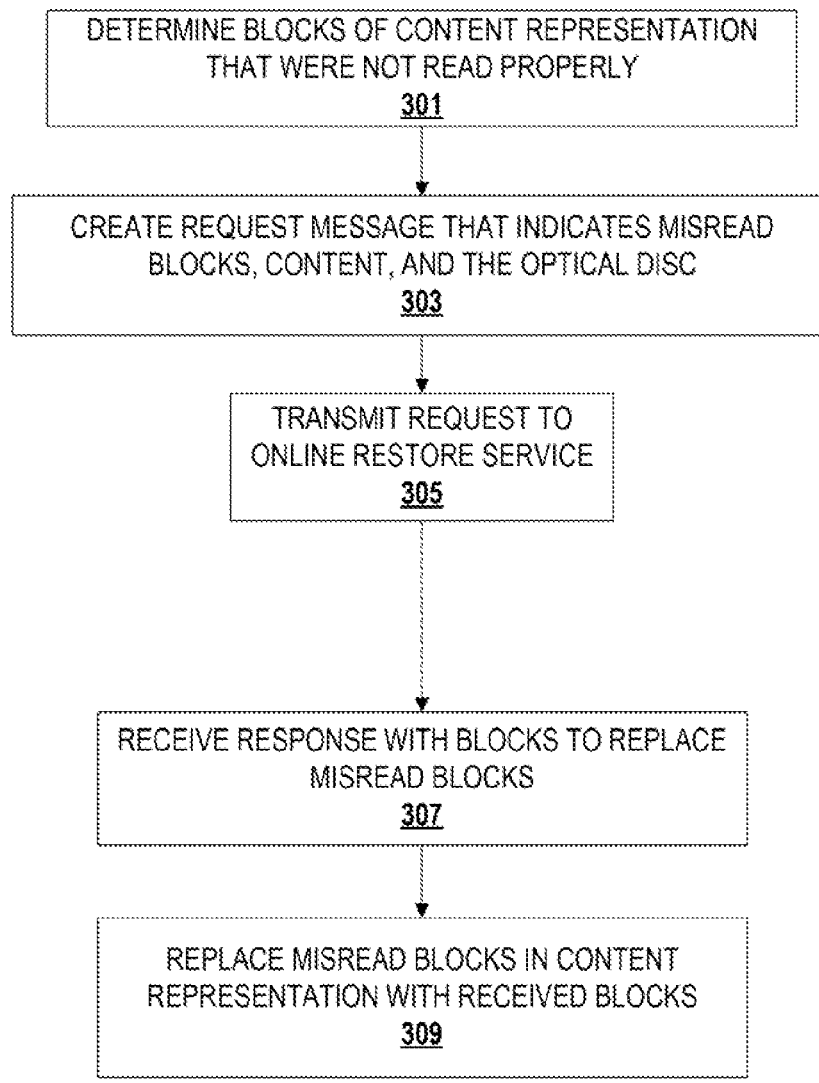
FIG. 3 depicts a flowchart of example operations for restoring a content representation with valid data blocks.

FIG. 3 depicts a flowchart of example operations for restoring a content representation with valid data blocks. At block 301, blocks of a content representation that were not read accurately are determined. At block 303, a request message is created that indicates the misread blocks, the content, and the optical disc. At block 305, the request message is transmitted to an online restore service. A dashed line from block 305 to block 307 represents time awaiting a response to the transmitted request. At block 307, a response is received with blocks to replace the misread blocks. At block 309, the misread blocks are replaced with the received blocks. As stated above, implementations may replace more than the misread blocks due to synchronization of boundaries of the received data into the content representation.

Figure 4:
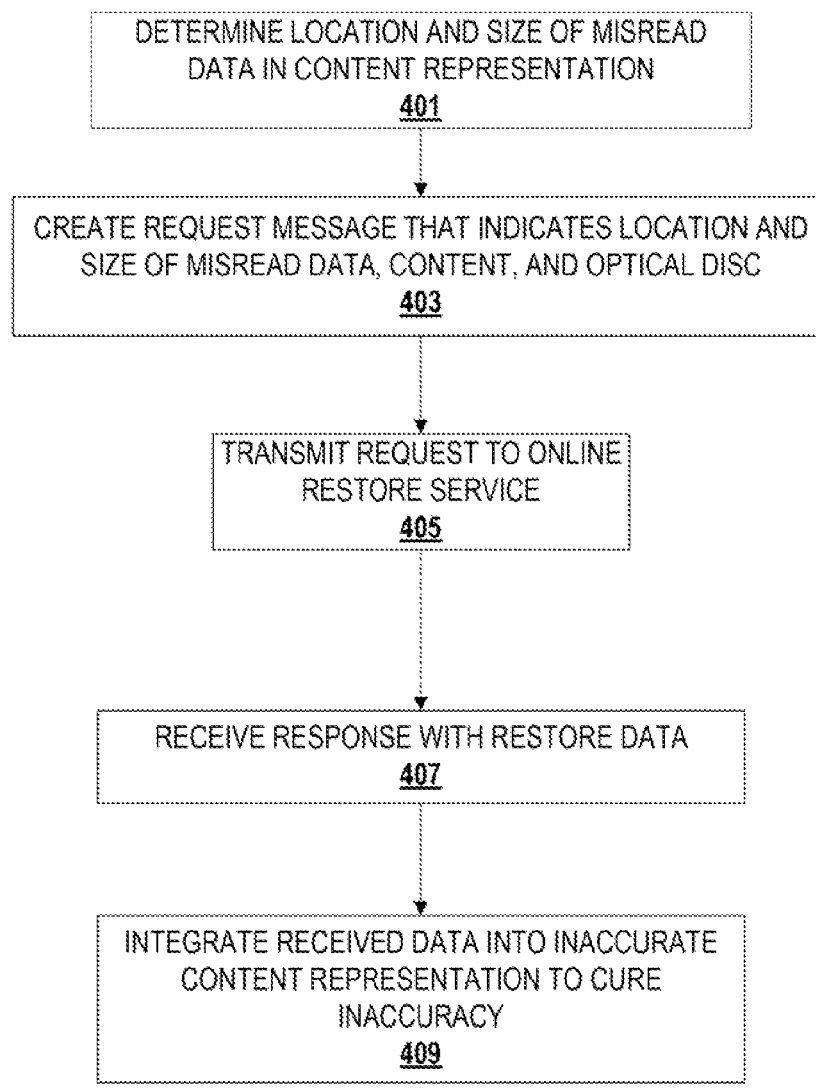
FIG. 4 depicts a flowchart of example operations for restoring a content representation with accurate data.

It is assumed in the above flowchart that the restore unit operates with blocks or sections. Embodiments, however, may operate with a data size that deviates from current encoding standards or default data chunks. FIG. 4 depicts a flowchart of example operations for restoring a content representation with accurate data. At block 401, location and size of misread data in a content representation is determined. At block 403, a request message is created that indicates the misread data (e.g., time and size), the content, and the optical disc. At block 405, the request message is transmitted to an online restore service. The dashed line from block 405 to block 407 represents time while awaiting a response. At block 407, a response message is received with the restore data. At block 409, the restore data is integrated into the inaccurate content representation to cure the inaccuracy.

It should be understood that the example operations depicted in FIGS. 3 and 4 are intended to aid in understanding embodiments and should not be used to limit embodiments. Additional, fewer, or different operations may be performed. For example, additional operations may be performed to a user to login into the online restore service. Additional operations may be performed to request a particular type of representation (e.g., MP3, WMA, MIDI, JPEG, GIF, etc.). As another example, a restore unit may transmit a hash of the content representation for the online restore service to analyze and determine which data to transmit back. In yet another example, additional operations may be performed to acquire the restore data if the response message includes a link to the restore data instead of the restore data itself.

Figure 5:
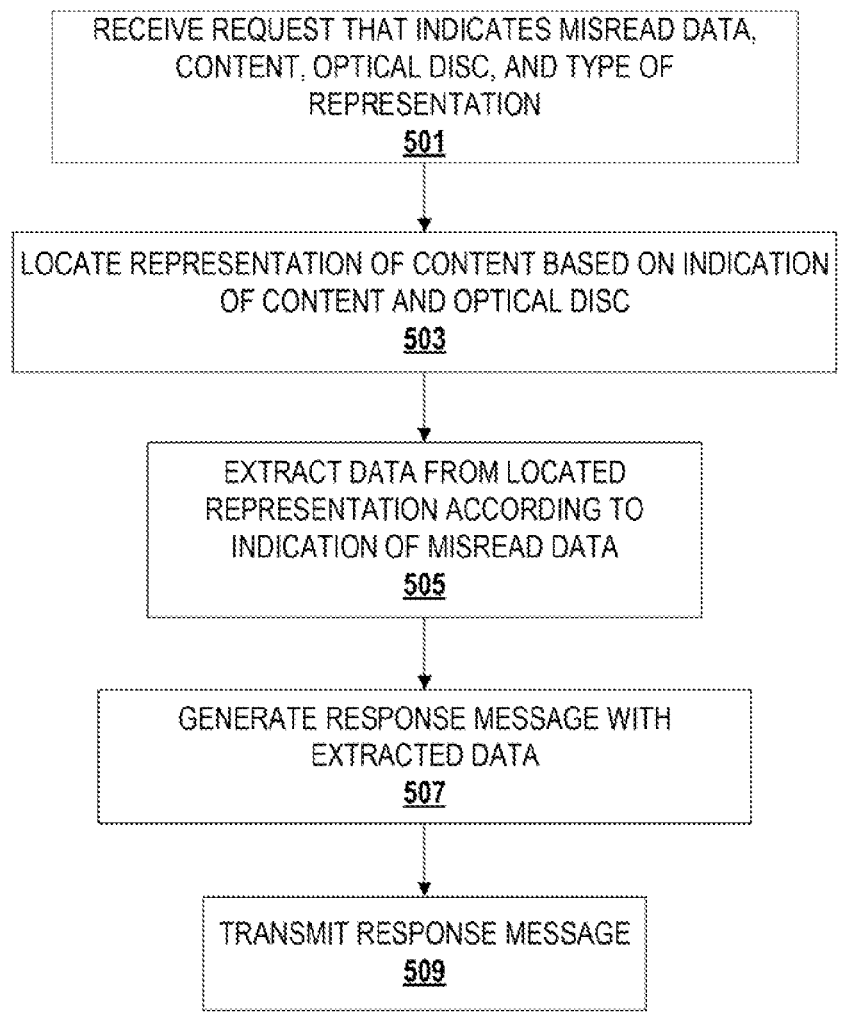
FIG. 5 depicts a flowchart of example operations for an online restore service to supply restore data.

FIG. 5 depicts a flowchart of example operations for an online restore service to supply restore data. At block 501, the online restore service receives a request that indicates misread data, content, optical disc, and content representation type. At block 503, the online restore service locates a content representation based on the indication of content, representation type, and perhaps the optical disc indication. At block 505, the online restore service extracts data from the located representation according to the indications of misread data. At block 507, the online restore service generates a response message that indicates the extracted data. At block 509, the online restore service transmits the response message.

One can envision a variety of schemes for implementing the online restore service. The online restore service may only restore content for members who pay a membership fee every month for a certain total amount of data. The online restore service may allow anyone to use the service and levy a fee based one or more of a variety of variables, such as size of data transferred, percentage of content supplied, per album, frequency of restore requests, etc. Furthermore, additional services or advertisements can piggyback or be associated with the restore service. For instance, the service may offer to upgrade the content representation to a higher quality for an additional fee. The service may offer to sell the entire content representation for a slightly higher fee than the restore.

Unfortunately, the online restore service may be susceptible to misuse. To at least limit misuse, the restore service can utilize damage to an optical disc as a signature for a particular optical disc. For instance, two optical discs that store a particular music album will most likely not have the same scratches. The set of scratches on the first compact disc can be used to distinguish it from the second optical disc. A restore service can use a digital representation of the damage to an optical disc in conjunction with information that identifies content and, perhaps, an optical disc identifier to track use of the restore service.

Figure 6:
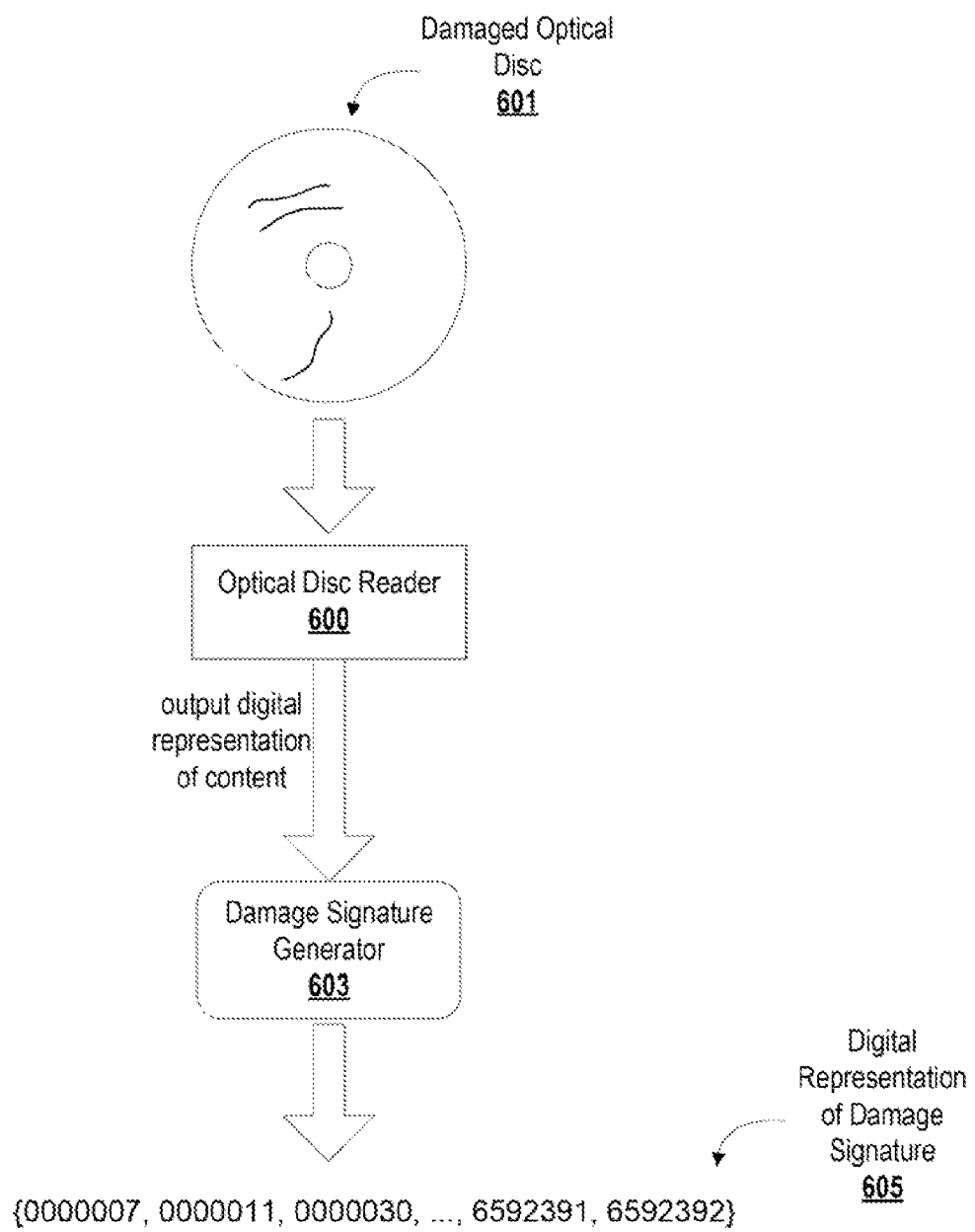
FIG. 6 depicts a conceptual example of a damage signature generator generating a digital representation of a damage signature.

FIG. 6 depicts a conceptual example of a damage signature generator generating a digital representation of a damage signature. A damage signature generator 603 examines a digital representation of content output from an optical disc reader 600 that reads a damaged optical disc 601. The damage signature generator 603 examines the received digital representation for indications of misread data sections. The damage signature generator 603 creates a data set of the misread data sections. In the example depicted in FIG. 6, the data set is illustrated as {0000007, 0000011, 0000030, . . . , 6592391, 6592392}. The data set acts as a digital representation 605 of the damage signature. A restore service would then use the digital representation 605 to identify the optical disc 601.

Figure 7:
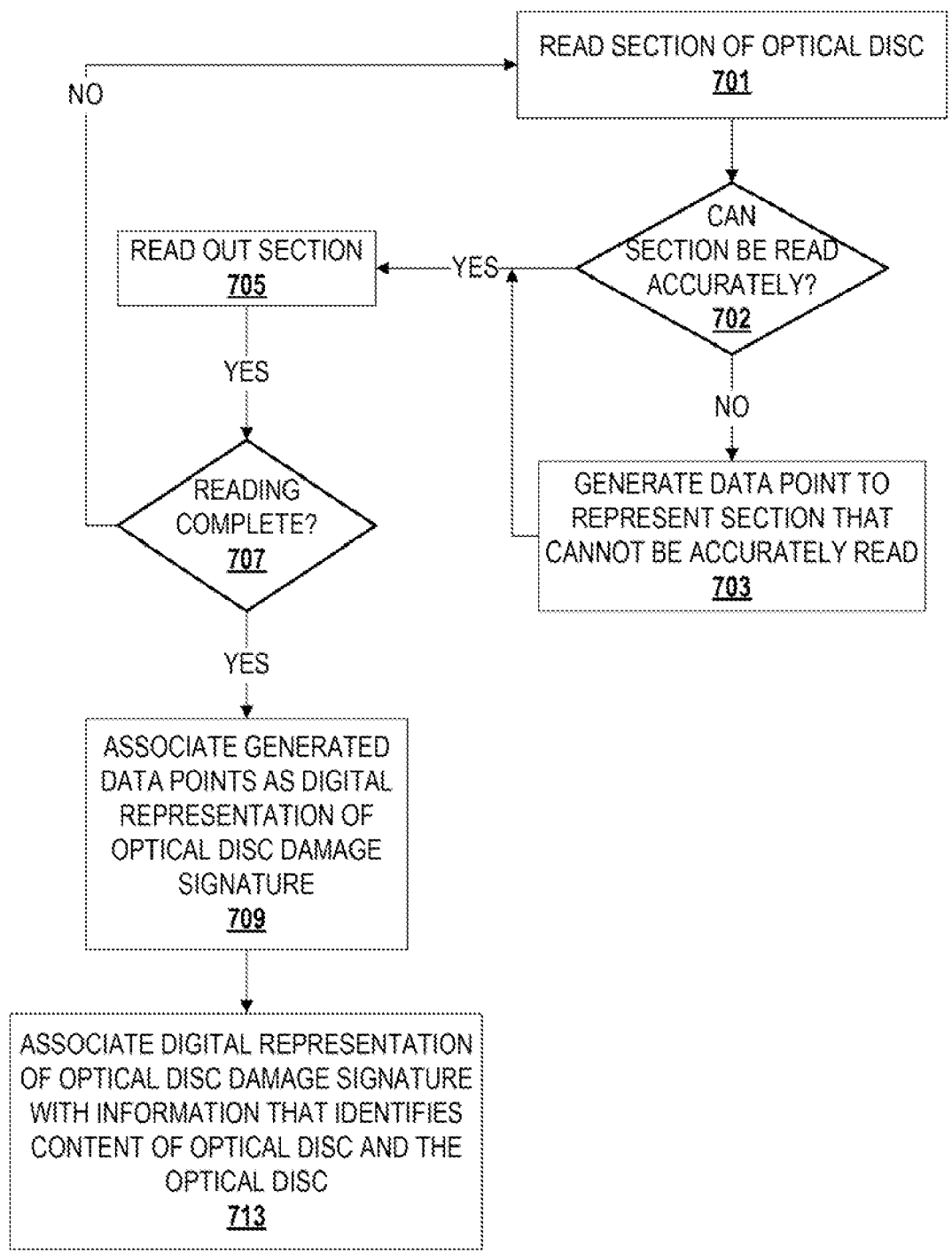
FIG. 7 depicts a flowchart of example operations for generating a digital damage signature representation.

FIG. 7 depicts a flowchart of example operations for generating a digital damage signature representation. At block 701, a section of an optical disc is read. At block 702, it is determined if the section of the optical disc can be read accurately. If the section cannot be read accurately, then control flows to block 703. If the section can be read accurately, then control flows to block 705.

At block 703, a data point is generated that represents the section that cannot be read accurately. Control flows from block 703 to block 705. At block 705, the section is read out (e.g., representation of the content being read is transmitted). At block 707, it is determined if reading is complete. If reading is not complete, then control flows back to block 701. If reading is complete, then control flows to block 709.

At block 709, generated data points are associated together as a digital representation of the optical disc damage signature. At block 713, the digital representation of the optical disc damage signature is associated with information that identifies content of the damaged optical disc and information that identifies the damaged optical disc.

The example operations of FIG. 7 assume integration of a damage signature generator and an optical disc reader. It should be understood, however, that implementations may differ. It should also be understood that different implementations may perform fewer, additional, or different operations than those depicted in FIG. 7. Examples of other operations include evaluating an inaccurate content representation against heuristics to determine misread data sections, comparing a hash of the inaccurate content representation output by the optical disc reader against a hash of a known accurate content representation, submitting the inaccurate content representation to a service to determine misread data sections, etc.

Figure 8:
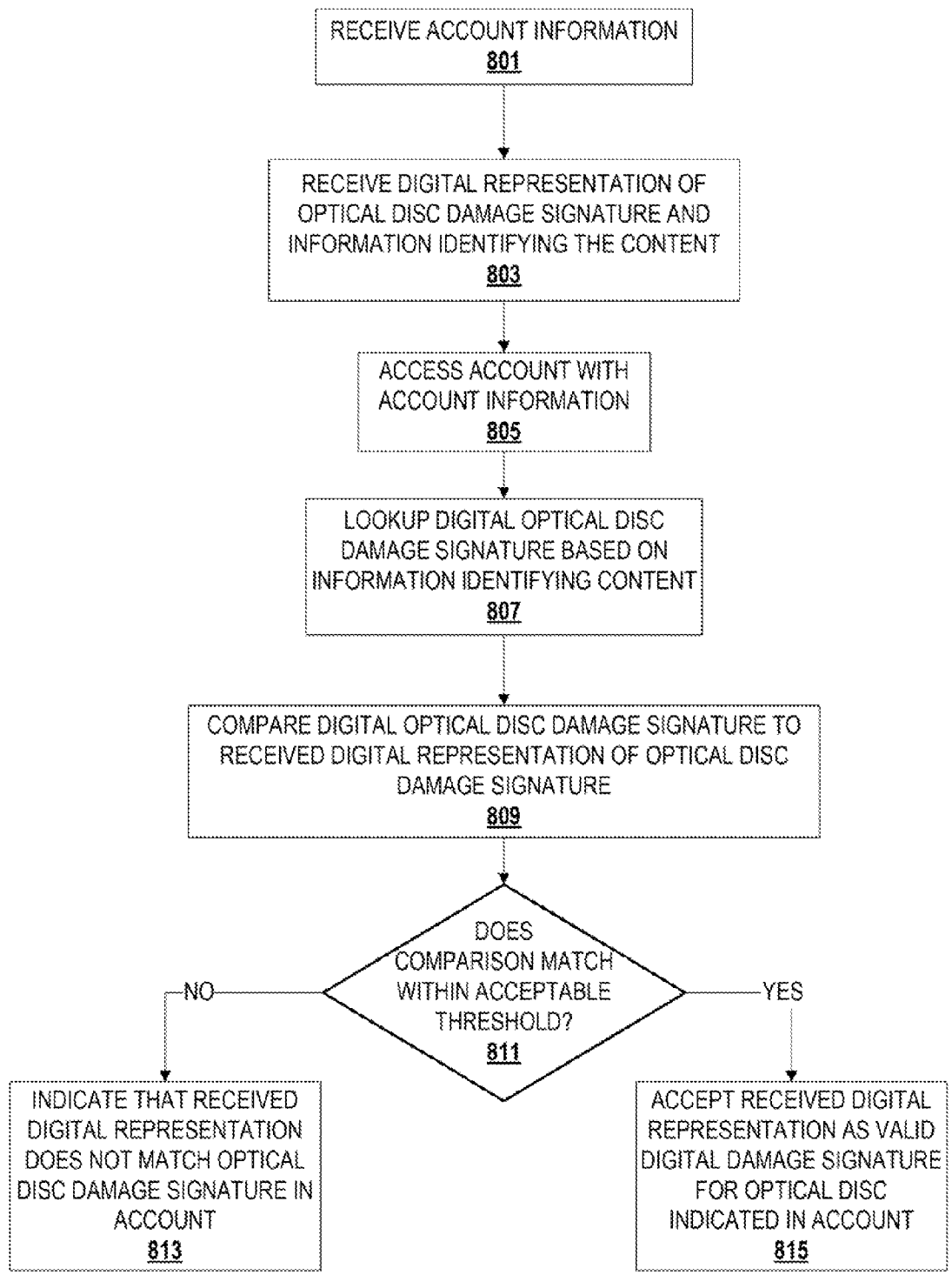
FIG. 8 depicts a flowchart of example operations for verifying identify of an optical disc with a digital damage signature.

FIG. 8 depicts a flowchart of example operations for verifying identify of an optical disc with a digital damage signature. At block 801, account information is received. At block 803, a digital representation of a damage signature for an optical disc is received with information that identifies content on the optical disc. At block 805, an account is accessed based on the account information. At block 807, a digital damage signature is looked up based on the content identifying information. At block 809, the digital damage signature is compared against the received digital representation of the optical disc damage signature. At block 811, it is determined if the compared digital damage signatures match within an acceptable. Note that the received digital representation of the optical disc damage signature is a digital damage signature, but the different monikers are used to distinguish the received digital damage signature from the comparison digital damage signature. If the comparison matches within an acceptable threshold, then control flows to block 815. If the comparison does not match within an acceptable threshold, then control flows to block 813.

At block 813, it is indicated that the received digital representation of the optical disc damage signature does not match the digital damage signature indicated in the account.

At block 815, the received digital representation is accepted as a valid digital damage signature for the corresponding optical disc.

Comparison of digital damage signatures may be implemented with any of a variety of techniques. For instance, the comparison may determine whether the received digital damage signature represents damage that matches or is a superset of the damage represented by the comparison digital damage signature. Damage to an optical disc, however, may not always increase. Some scratches in the plastic, for example, may be buffed out. In addition, different optical readers may generate slightly different representations of misread data sections from the same damaged optical disc. To address some issues, validation may employ an intersection based technique. For example, assume the received digital damage signature is {0000007-0000009, 0000011-0000016, 0000030-0000107, . . . } and the comparison digital damage signature is {0000007, 0000011, 0000030, . . . , 6592391, 6592392}. The received digital damage signature does not include {6592391, 6592392}. A validation operation that uses a match or superset type comparison would erroneously reject the received digital damage signature.

An intersection type comparison, would compare the two digital damage signatures to determine if there was an intersection of some percentage of misread data sections. An embodiment may deem an optical disc as correctly identified if a certain threshold of values that represent the damage signatures intersect. The threshold may be expressed in various manners. For example, a threshold may be expressed as a percentage of the smaller digital damage signature values that match values of the larger digital damage signature. In another example, it is determined if the number of intersecting misread data sections is equal to or greater than a percentage of the number of misread data sections indicated by the larger one of the digital damage signatures.

FIG. 9 depicts an example data structure that associates digital damage signatures with account information. An example data structure 901 includes multiple entries indexed by user identifiers. Each entry includes account information, one or more content identifiers, and one or more digital damage signatures. As an illustration, account information for a user may indicate allowed services, history of use, and amount paid. The history of use may indicate that the user has restored a particular track of a particular album twice. The restore service may limit users to three restores of the same track. The account information may also indicate that a user has failed optical disc damage signature validation multiple times, suggesting possible misuse of the account by the user. A content identifier may indicate at least one of title of a track, album name, track length, track size, etc.

Figure 11:
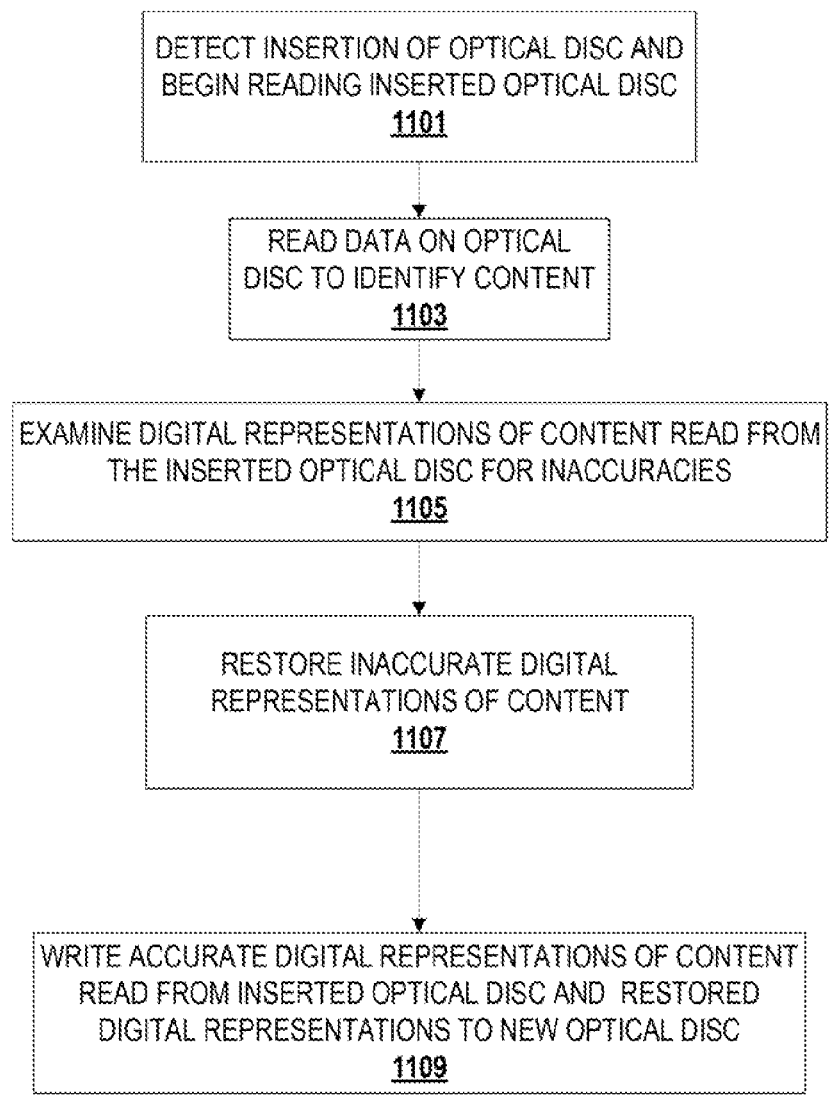
FIG. 11 depicts a flowchart of example operations for restoring misread data from a local content restore device.

In the above examples, the restore data is supplied over a network. Embodiments, however, are not limited to supplying restore data over a network. Restore data may be supplied from a local repository of content representations. For example, a kiosk may include a database of digital representations of content. A user inserts their optical disc into the kiosk. The kiosk reads the inserted optical disc and discovers that some portions of the content cannot be read accurately. The kiosk restores misread data sections read from the inserted optical disc and provides the user with a new optical disc with restored digital representations of content. FIG. 11 provides a more generic description of operations for such an embodiment.

FIG. 11 depicts a flowchart of example operations for restoring misread data from a local content restore device. At block 1101, insertion of an optical disc is detected and reading of the inserted optical disc is begun. At block 1103, data that identifies the content on the optical disc is read. At block 1105, digital representations of the content read from the inserted optical disc are examined for inaccuracies. At block 1107, inaccurate digital representation of the content are restored. At block 1109, accurate digital representations of content read from the inserted optical disc and restored digital representations are written to a new optical disc.

In the above example, various pay schemes can be utilized. A service provider can charge for the amount of data restored, the number of representations restored, etc. In addition, a content restore device may create a new optical disc without restoring digital representations. The content restore device would examine the digital representations of content read from the optical disc for inaccuracies. The content restore device then uses the determined inaccuracies as a basis for charging a user for the new optical disc.

The described embodiments may be provided as a computer program product, or software, that may include a machine-readable medium having stored thereon instructions, which may be used to program a computer system (or other electronic device(s)) to perform a process according to embodiments of the invention, whether presently described or not, since every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Figure 10:
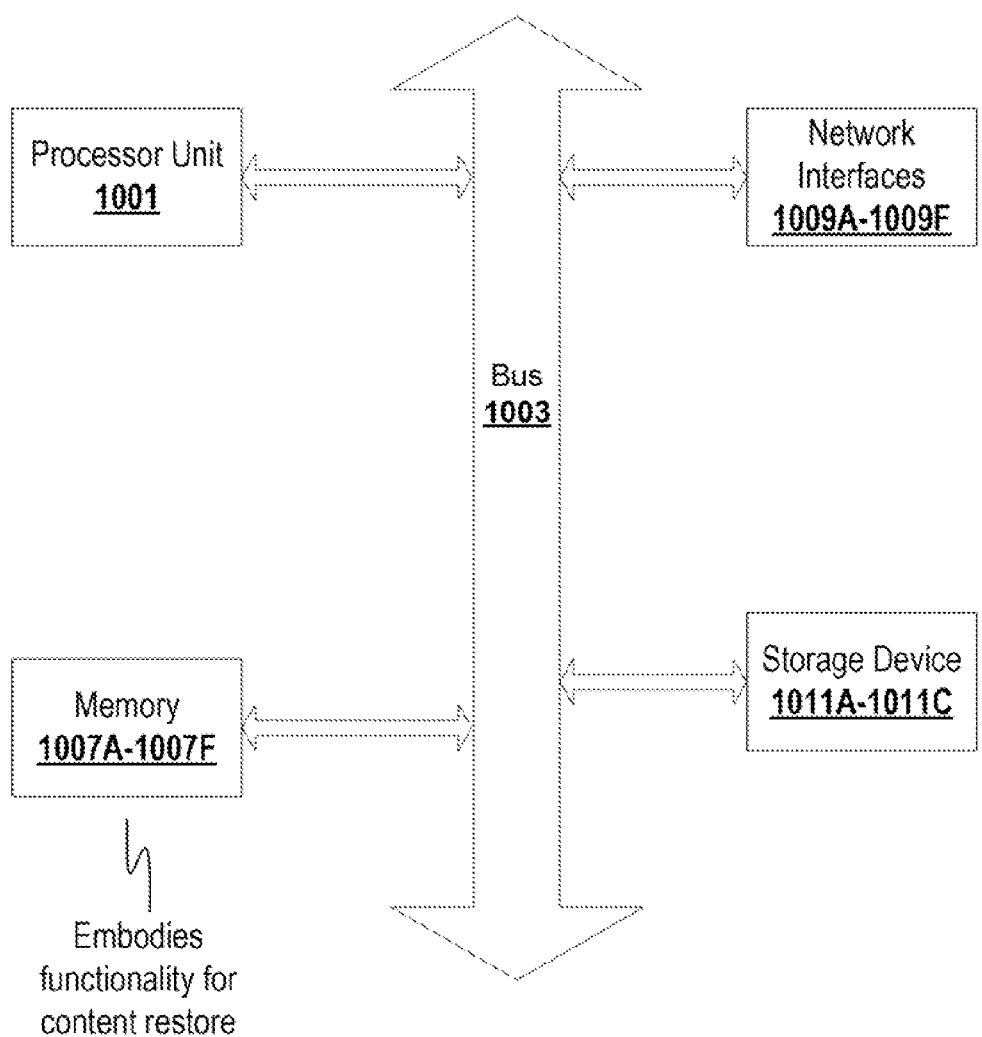
FIG. 10 depicts an example computer system.

FIG. 10 depicts an example computer system. A computer system includes a processor unit 1001 (possibly including multiple processors, multiple cores, multiple nodes, and/or implementing multi-threading, etc). The computer system includes memory 1007A-1007F. The memory 1007A-1007F may be system memory (e.g., one or more of cache, SRAM, DRAM, RDRAM, EDO RAM, DDR RAM, EEPROM, etc.) or any one or more of the above already described possible realizations of machine-readable media. The computer system also includes a bus 1003 (e.g., PCI, ISA, PCI-Express, HyperTransport, InfiniBand, NuBus, etc.), a network interface 1005 (e.g., an ATM interface, an Ethernet interface, a Frame Relay interface, SONET interface, etc.), and a storage device(s) 1009A-1009D (e.g., optical storage, magnetic storage, etc). The system memory 1007A-1007F embodies functionality to implement embodiment described above. The system memory 1007A-1007F may include functionality for content restore and/or functionality for creation of a digital damage signature. The system memory 1007A-1007F may include functionality for supplying restore data and/or validating a digital damage signature. Any one of these functionalities may be partially (or entirely) implemented in hardware and/or on the processing unit 1001. For example, the functionality may be implemented with an application specific integrated circuit, in logic implemented in the processing unit 1001, in a co-processor on a peripheral device or card, etc. Further, realizations may include fewer or additional components not illustrated in FIG. 10 (e.g., video cards, audio cards, additional network interfaces, peripheral devices, etc). The processor unit 1001, the storage device(s) 1009A-1009D, and the network interface 1005 are coupled to the bus 1003. The memory 1007A-1007F is coupled directly or indirectly to the bus 1003.

OTHER EMBODIMENTS

While the invention(s) is (are) described with reference to various implementations and exploitations, it will be understood that these embodiments are illustrative and that the scope of the invention(s) is not limited to them. In general, techniques for restoring content read from a damaged optical disc and/or identifying an optical disc using a digital damage signature as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the invention(s).

What is claimed is:

1. A method comprising:
examining a digital representation of content read from an optical disc;
detecting that a portion of the digital representation inaccurately represents a corresponding portion of the content;
retrieving a portion of an accurate digital representation of the content, wherein the retrieved portion corresponds to at least the detected inaccurate portion;
integrating the retrieved portion into the examined digital representation to restore the examined digital representation to accurately represent the content.

2. The method of claim 1, wherein the content is selected from a set consisting essentially of image, audio, and video.

3. The method of claim 1 further comprising;
generating a message that indicates the content, representation type, the optical disc, and the detected portion;
transmitting the generated message to an online content restore service over a network; and
retrieving the portion of the accurate representation of the content from over the network, wherein the accurate representation is stored remotely.

4. The method of claim 1 further comprising rendering the examined representation with the integrated retrieved portion.

5. The method of claim 1 further comprising archiving the examined representation with the integrated retrieved portion.

6. The method of claim 1, wherein the examining comprises searching the representation for indications of data sections misread by an optic disc reader.

7. The method of claim 1, wherein the examining is selected from a set consisting essentially of evaluating the representation against one or more heuristics, comparing hash of the examined representation against a hash of the accurate representation, searching for markers that indicate misread data sections.

8. A method comprising:
receiving a request to restore content read from an optical disc, wherein the request indicates a portion of the content;
locating an accurate digital representation of the content based, at least in part, on the received request;
extracting a portion of the accurate digital representation that corresponds to the portion indicated in the request; and
supplying a response to the request, wherein the response indicates the extracted portion of the accurate digital representation.

9. The method of claim 8, wherein the content is selected from a set consisting essentially of image, audio, and video.

10. The method of claim 8 further comprising advertising additional content or services with the response.

11. The method of claim 8, wherein the response includes the extracted portion or a reference to a location to access the extracted portion.

12. The method of claim 8, wherein the accurate digital representation is located based, at least in part, on a representation type.

13. The method of claim 8 further comprising tracking requests for restoration of the content by a given user.

14. A program product encoded in one or more machine-readable media, which when executed by a set of one or more processing units causes the set of one or more processing units to perform operations that comprise:
examining a digital representation of content read from an optical disc;
detecting that a portion of the digital representation inaccurately represents a corresponding portion of the content;
retrieving a portion of an accurate digital representation of the content, wherein the retrieved portion corresponds to at least the detected inaccurate portion;
integrating the retrieved portion into the examined digital representation to restore the examined digital representation to accurately represent the content.

15. The program product of claim 14, wherein the content is selected from a set consisting essentially of image, audio, and video.

16. The program product of claim 14, wherein the operations further comprise:
generating a message that indicates the content, representation type, the optical disc, and the detected portion;
transmitting the generated message to an online content, restore service over a network; and
retrieving the portion of the accurate digital representation of the content from over the network, wherein the accurate digital representation is stored remotely.

17. The program product of claim 14, wherein the operations further comprise rendering the examined digital representation with the integrated retrieved portion.

18. The program product of claim 14, wherein the examining comprises searching the digital representation for indications of data sections misread by an optical disc reader.

19. The program product of claim 14, wherein the examining operation comprises evaluating the digital representation against one or more heuristics.

20. The program product of claim 14, wherein the operations further comprise generating a hash of the examined digital representation.

* * * * *